(12) United States Patent
Nielsen et al.

(10) Patent No.: US 9,273,669 B2
(45) Date of Patent: Mar. 1, 2016

(54) HYDRAULIC BRAKE WITH A POLYMER PISTON

(71) Applicant: S.B. Patent Holding ApS, Vejstrup (DK)

(72) Inventors: Poul Sejer Nielsen, Odense (DK); Peter Hornskov, Odense SO (DK)

(73) Assignee: S.B. Patent Holding ApS, Vejstrup (DK)

( * ) Notice: Subject to any disclaimer, the term of this patent is extended or adjusted under 35 U.S.C. 154(b) by 0 days.

(21) Appl. No.: 14/366,581

(22) PCT Filed: Dec. 20, 2012

(86) PCT No.: PCT/EP2012/076304
§ 371 (c)(1),
(2) Date: Jun. 18, 2014

(87) PCT Pub. No.: WO2013/092814
PCT Pub. Date: Jun. 27, 2013

(65) Prior Publication Data
US 2014/0367210 A1      Dec. 18, 2014

(30) Foreign Application Priority Data

Dec. 21, 2011 (EP) .................................... 11194893

(51) Int. Cl.
*F16D 55/10* (2006.01)
*F03D 7/02* (2006.01)
*F16J 1/00* (2006.01)
(Continued)

(52) U.S. Cl.
CPC ............. *F03D 7/0248* (2013.01); *F03D 7/0244* (2013.01); *F16D 65/0068* (2013.01); *F16J 1/003* (2013.01); *F16D 2125/06* (2013.01)

(58) Field of Classification Search
CPC ........ F16D 2125/06; F16J 1/001; F16J 1/003; F16J 1/01; F16J 1/04
USPC .......... 188/72.4, 73.1; 92/202, 209, 212, 248, 92/249, 250
See application file for complete search history.

(56) References Cited

U.S. PATENT DOCUMENTS 1,746,733 A *  2/1930 Lamb ............................. 92/243
2,307,671 A     1/1943 Dodge
(Continued)

FOREIGN PATENT DOCUMENTS

DE    102009019662 A1   10/1993
EP         1637761 A1    3/2006
JP        62-137434 A    6/1987

OTHER PUBLICATIONS

International Search Report issued in International (PCT) Application No. PCT/EP2012/076304 (Mar. 27, 2013).

*Primary Examiner* — Thomas J Williams
(74) *Attorney, Agent, or Firm* — Reising Ethington, P.C.

(57) ABSTRACT

The present invention relates in particular, but not limited to, a wind turbine hydraulic brake calliper. The brake calliper comprising a cylinder bore, a piston having a piston head and a piston skirt. The piston being received in the cylinder bore in an orientation where the piston head faces towards the brake pad. The calliper comprising a fluid connection connected to or connectable to a source of hydraulic fluid for leading hydraulic fluid into the void of the cylinder bore below the piston head (1b), so as to move the piston. The piston is formed at least partly and preferably solely from a polymeric material or from polymeric materials.

20 Claims, 3 Drawing Sheets (51) Int. Cl.
*F16D 65/00* (2006.01)
*F16D 125/06* (2012.01)

(56) References Cited

U.S. PATENT DOCUMENTS

| | | | | |
|---|---|---|---|---|
| 2,330,563 A | * | 9/1943 | Duval | 92/245 |
| 2,548,008 A | * | 4/1951 | Franklin | 188/72.4 |
| 3,176,595 A | * | 4/1965 | Schwartz | 92/243 |
| 3,265,167 A | | 8/1966 | Yazell, Jr. | |
| 3,902,405 A | * | 9/1975 | Costarella et al. | 92/192 |
| 4,214,507 A | * | 7/1980 | Hock et al. | 92/254 |
| 4,281,590 A | * | 8/1981 | Weaver | 92/244 |
| 4,605,104 A | * | 8/1986 | Thompson | 188/72.4 |
| 4,813,343 A | * | 3/1989 | Schaefer | 92/243 |
| 4,858,516 A | * | 8/1989 | Klein | 92/240 |
| 5,249,649 A | | 10/1993 | Emmons | |
| 5,492,202 A | * | 2/1996 | Drotar et al. | 188/72.4 |
| 5,540,311 A | * | 7/1996 | Kobayashi et al. | 188/72.4 |
| 5,562,186 A | * | 10/1996 | Osenbaugh | 188/72.4 |
| 6,085,636 A | * | 7/2000 | Ruckert et al. | 92/254 |
| 6,382,367 B1 | * | 5/2002 | Varzescu et al. | 188/72.7 |
| 6,443,048 B1 | * | 9/2002 | Fischbach | 92/222 |
| 8,348,030 B2 | * | 1/2013 | Alamin et al. | 188/72.4 |

\* cited by examiner

HYDRAULIC BRAKE WITH A POLYMER PISTON

This application is the national stage application of, and claims priority to, International Application No. PCT/EP2012/076304 filed Dec. 20, 2012, the entire disclosure of which is incorporated herein by reference. The International Application was published in the English language on Jun. 27, 2013 as International Publication No. WO 2013/092814 and itself claims the benefit of European Patent Application No. 11194893.1 filed Dec. 21, 2011, the entire disclosure of which is incorporated herein by reference.

FIELD OF THE INVENTION

The present invention relates in particular, but not limited to, a wind turbine hydraulic brake calliper. The brake calliper comprising a cylinder bore, a piston having a piston head, and a piston skirt. The piston being received in the cylinder bore in an orientation where the piston head faces towards the brake pad. The calliper comprising a fluid connection connected to or connectable to a source of hydraulic fluid for leading hydraulic fluid into the void of the cylinder bore below the piston head, so as to move the piston. The piston is formed at least partly and preferably solely from a polymeric material or from polymeric materials.

BACKGROUND AND OBJECT OF THE INVENTION

Hydraulic brakes as dealt with herein are today produced with a piston made from metal. The piston is slidably yet sealingly received in a cylinder bore provided in a calliper. The piston acts due to its movement on a brake pad which increases the friction between a brake disc and the brake pad. As the movement of the piston and pressure asserted on the brake pad from the piston are provided by the pressurised hydraulic fluid in the void below the piston in the cylinder in which the piston is arranged, a sealing must be provided between the skirt of the piston and the cylinder wall. Such a sealing is made from a flexible sealing, typically made from a polymeric material, arranged in a groove in the cylinder wall, which sealing fills the clearance provided between the piston skirt and the cylinder wall.

While this has proven to be a workable solution in systems where the piston is activated—that is moved by the hydraulic fluid relatively to the cylinder wall—on a regular basis in vehicle brakes, it has been found that in wind turbine applications, where the brake not necessarily is activated regularly, that there is a risk of the movement of the piston becomes hindered due to corrosion of the piston and the cylinder wall, as well as less effective during longer standstill.

Furthermore, the movement of the piston in the cylinder bore results in friction deteriorating the sealing, the piston itself and the cylinder bore. Such wear often results in leaks hampering the braking effect obtainable.

In addition, the known brake callipers require delicate machining such as grinding, polishing, honing etc. to obtain suitable friction characteristics and fitting between the calliper and piston.

An often devastating problem with the known callipers is that the piston may be wedged in the cylinder bore so that no movement of the piston—and thereby no brake effect—can be obtained.

Furthermore, the mass of the known callipers is often high due to the strength requirement and the metal compositions used for the parts which often are disadvantageous.

Hence, an improved brake calliper for a wind turbine application would be advantageous, and in particular a more efficient and/or reliable brake for a wind turbine would be advantageous.

It is a further object of the present invention to provide an alternative to the prior art.

In particular, it may be seen as an object of the present invention to provide a wind turbine 20 hydraulic brake calliper, a wind turbine hydraulic brake system and a wind turbine with a hydraulic brake calliper and/or system that solves the abovementioned problems of the prior art.

SUMMARY OF THE INVENTION

The invention relates in a first aspect to wind turbine hydraulic brake calliper. The brake calliper may preferably comprise a cylinder bore, a piston having a piston head and a piston skirt. The brake calliper is adapted to accommodate a brake pad which thereby may also be considered as being comprised in the calliper. The piston is received in the cylinder bore in an orientation where the piston head faces towards the brake pad, and the calliper typically further comprises a fluid connection connected to or connectable to a source of hydraulic fluid for leading hydraulic fluid into the void of the cylinder bore below the piston head, so as to move the piston. The piston is formed at least partly—and preferably solely—from a polymeric material or polymeric materials.

In the present context, polymeric material is preferably used to mean a material composed of polymers being large molecules (macromolecule) composed of repeating structural units. These subunits are typically connected by covalent chemical bonds. Although the term polymer is sometimes taken to refer to plastics, it actually encompasses a large class comprising both natural and synthetic materials with a wide variety of properties.

A piston made from a polymeric material has been found to provide a number of advantages, some of which are listed herein and below.

For instance, a sealing to avoid leak of hydraulic fluid between the wall of the cylinder bore and the piston skirt is easily obtainable as the flexibility provided by the piston tends to press the piston skirts against the wall of the cylinder bore. This abutment provides a seal and the seal "self-increasing" in the sense that the abutment of the piston skirts against the wall increases when the pressure in the hydraulic fluid increases.

Furthermore, the sealing provided is less sensitive to imperfections in and/or abrasions of the surfaces of the piston skirts and the cylinder bore compared to conventional pistons made of metal where the sealing is provided by rubber seals arranged in between the piston and the cylinder bore.

The calliper is considered less sensitive than conventional calliper with respect to the roundness of the piston and cylinder bore as the piston is able to expand in the cylinder bore due to the pressure in the cylinder bore.

Also, a higher certainty as to obtaining a braking action may be provided even in situations where the piston should become wedged in the cylinder bore, due to the flexibility of the piston which in case of wedging may result in the piston head flexes and e.g. moves the brake pad towards the brake disc.

In addition, production of the calliper and the piston has been rendered easier and possibly also cheaper than the conventional piston and cylinder bore configurations, inter alia due to the less requirements as to the smoothness of the surfaces.

As is disclosed herein pistons according to the invention are made at least partially or solely from a polymeric material or combinations of polymeric materials. Often such a material is a rubber material and in some embodiments pistons are made solely from such rubber materials. Alternatively, the piston may be a layered construction in which a core material provides the strength of the piston and an outer layer being more soft than the core material provides the sealing effect between the piston and the cylinder bore.

Pistons made at least partially from a polymeric material may typically include constructions where a core material is made from a non-polymeric material, such as metal, which is covered at least partially by a polymeric material to provide a sealing effect. Furthermore, pistons made at least partially from a polymeric material may typically also include a piston constructions with non-polymeric elements enclosed in the piston e.g. the piston head may include an embedded disc made e.g. from metal and the remaining piston being made from a polymeric material.

Preferably, at least a portion of the piston skirt abuts and is biased against the wall of the cylinder bore along a circumference of the cylinder bore so as to provide a hydraulic fluid sealing between the piston and cylinder bore. The biasing may also provide a sealing although the pressure in the cylinder bore is not sufficiently high to deform the piston, which typically is the case when no braking force is demanded. Typically, the biasing against the wall of at least a portion of the piston skirt is provided by the dimension of said portion of the piston skirt being larger than the dimension of the cylinder bore so that said portion of the piston skirt is compressed when the piston is received in the cylinder bore.

The piston is made at least partly from polymeric materials and the piston is preferably a layered construction comprising a core material of a polymer being harder than an outer layer preferably made of a polyester elastomer, or the core material being of metal. Such layered constructions may have the stiffness and mechanical strength provided by the core material and the outer layer providing sealing properties as it may be given the possibility of adapt to the surface of the cylinder bore. Preferably, the outer layer covers the outer surface of the core material, wherein the outer surface of the core material is the surface of the core material facing towards the brake pad and the cylinder bore. However, a section of the surface of core material facing towards the brake pad may be left uncovered. In further preferred embodiments the outer layer also covers the inner surface of the core material, wherein the inner surface of the core material is the surface facing opposite direction than the outer surface.

The core material is typically made from a polymer which can be characterised as a hard polymer, which preferably means that the hardness of the material is above 60 on the "Shore D" scale at 23° C. However, a hardness above 40 or above 80 may also be preferred.

Typically and preferably, the polymer is thermoplastic polyester resin (PBT), polyoxymethylene (POM), polysulfone (PSU), poly phenyl sulphide (PPS) or combinations thereof, preferably reinforced by glass fibres, aramid fibres and/or carbon fibres, and the metal is steel or aluminium, and, the polyester elastomer is thermoplastic polyurethane (TPU), Nitrile rubber, Viton rubber and/or a thermoplastic polyester elastomer (TPE-E).

Such layered constructions combine the properties of both materials (core material and outer layer). The core material provides a toughness that gives the piston its shape, and outside is the material that gives the piston its sealing effects. Furthermore, the piston can be made in one casting sequence, even though it consists of two materials. This makes the casting process more economic than two or more casting sequences, although it may require that the two materials can be casted at the same temperature. Another advantage of the layered construction is that the outer layer may be made to fully enclose the core material, which may provide a safeguard as to assuring that the hydraulic pressure pushes the piston skirt outwardly against the cylinder bore.

A given combination of the materials for the core and the outer layer is preferably selected so that the materials adhere to each other in order to avoid detachment of the outer layer from the core material or vice versa. Often, the materials are selected so that the materials melt together (fuses together).

In preferred embodiments of the invention, the piston is made from the two materials in a single cast. The thickness of outer layer and the thickness of the core material may vary accordingly at different locations of the piston. In addition, the outer layer may not only be limited to be situated to form the outer surface of the piston but may also form the inner surface of the piston. However, typical dimensions of the outer layer are around 0.5 mm at the piston head and between 0.5 mm at the lower portion of the piston skirt and 1.6 mm at the upper portion of the piston skirt.

In preferred embodiments, the outer surface of the piston skirt may preferably be frusto-conical shaped with the lowest portion of the piston skirt having the widest dimension, and the portion of the piston skirt abutting and being biased against the wall of the cylinder bore is preferably the lowest portion of the skirt.

In preferred embodiments of the invention, the piston may comprise a ring shaped bulge, preferably being made integral with the piston, at the piston skirt and encircling the piston. The ring shaped bulge abuts and is biased against the wall of the cylinder bore. Such ring shaped bulge may assist in sealing between the piston and wall of the cylinder bore. The biasing against the wall of the ring shaped bulge may preferably be provided by dimensioning the ring shaped bulge so that it is larger than the dimension of the cylinder bore, before the piston is received in the cylinder bore, so that ring shaped bulge is compressed when the piston is received in the cylinder bore.

In addition thereto or used alone, the calliper may preferably comprise a drainage channel for leak fluid and being in fluid communication with a leak element encircling the piston skirt in a position below the ring shaped bulge. Such drainage channel may divert hydraulic fluid leaking out of the cylinder bore in between the piston the cylinder wall away from the brake pad and brake disc, which hydraulic fluid could otherwise hamper the brake effect available if it come in contact with the brake pad and brake disc.

The leak element may preferably comprise a porous or permeable ring shaped element being in fluid communication with the drainage channel and encircling the piston skirt in a position below the ring shaped bulge. Such ring shaped elements have inter alia the effect of preventing blockage of the drainage channel due to the piston deforming under the influence of the pressure of the hydraulic fluid to such an extent that the surface of the piston blocks the opening of the drainage channel.

In many preferred embodiments, the piston is cup shaped having its open end facing the cylinder bore when the piston is received in the cylinder bore. Typically and preferably, the inner surface of the piston skirt is frusto-conical shaped with the lowest portion of the piston skirt having the widest dimension.

A wind turbine hydraulic brake calliper according to the present invention may preferably comprise a brake pad having a backing plate typically made from a composite material or steel with a tapered shaped brake material.

The backing plate may preferably be smoothly received in a recess provided in the calliper above the piston head so that the brake pad is able to follow the movement of the piston towards the brake disc while being hindered from movement in the rotational direction of the brake disc. Thereby, the brake calliper can accommodate the brake pad.

In another aspect the invention relates to a wind turbine comprising a wind turbine hydraulic brake calliper according to the present invention.

Preferably, the brake calliper may be arranged to form part of a parking brake of the wind turbine to park the rotor of the wind turbine, and/or the brake calliper may preferably be arranged to form part of a yaw brake.

It is noted, that although the invention is disclosed with reference to and has found to solve many of the problems pertaining to conventional wind turbine hydraulic brakes, it is envisaged that the invention has a wider range of applications, such as for instance vehicles in general (cars, motor bikes, bicycles etc.) and brakes in general. Thus, the present invention also relates to brakes and brake callipers in general.

The various aspects and embodiments disclosed herein may each be combined with any of the other aspects and embodiments. These and other aspects of the invention will be apparent from and elucidated with reference to the embodiments described hereinafter.

BRIEF DESCRIPTION OF THE FIGURES

The present invention will now be described in more detail with regard to the accompanying figures. The figures show ways of implementing the present invention and are not to be construed as being limiting to other possible embodiments falling within the scope of the attached claim set.

DETAILED DESCRIPTION OF EMBODIMENTS

Figure 1:
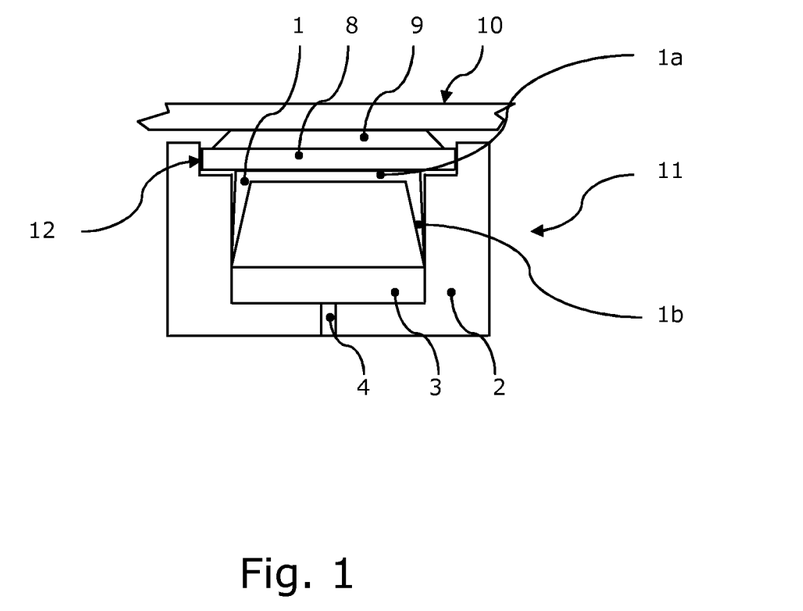
FIG. 1 shows schematically a 3-dimensional cross sectional view of a calliper according to the present invention.

Reference is made to FIG. 1 which shows schematically a wind turbine hydraulic brake calliper 11 for a wind turbine application. It is noted, that although the invention is disclosed with reference to and has found to solve many of the problems pertaining to conventional wind turbine hydraulic brakes, it is envisaged that the invention has a wider range of application, such as for instance vehicles in general (cars, motor bikes, bicycles etc) and brakes in general.

As shown in FIG. 1 the brake calliper 11 comprising a cylinder bore 3, a brake pad 9, a piston 1 having a piston head 1a, and a piston skirt 1b. The cylinder bore 3 is provided in the calliper 11 as cylindrical shaped bore and the piston 1 has circular cross sections. The calliper 11 is typically made from metal but other materials such as ceramics or a composite including Kevlar are considered applicable.

The piston 1 is slideable yet sealingly received in the cylinder bore as will be disclosed in further details below. As also shown in FIG. 1, the piston 1 is received in the cylinder bore 3 in an orientation where the piston head 1a faces towards the brake pad 9. The piston head 1a is made flat to mate with the flat surface of the backing plate 8. However, other shapes may be provided to the piston head 1a and the backing plate 8.

In the embodiment shown in FIG. 1, a backing plate 8 typically made from a composite material or steel, with a tapered shaped brake material 9 is arranged in between the brake disc 10 and the piston head 1a. Typically, the backing plate serves inter alia as guide for the brake pad 9 and is smoothly received in a recess 12 provided in the calliper 11 above the piston head so that the brake pad 10 is able to follow the movement of the piston towards the brake disc 10 while being hindered from movement in the rotational direction of the brake disc 10. In addition, the recess 12 may be shaped so that the brake pad 10 has a fixed orientation relatively to the brake disc 10 and the calliper 11. Thereby, the brake calliper can accommodate the brake pad.

The calliper 11 further comprising a fluid connection 4 connected to or connectable to a source of hydraulic fluid for leading hydraulic fluid into the void of the cylinder bore 3 below the piston head 1b. When hydraulic fluid is fed into this void under elevated pressure relatively to the pressure of the surroundings, a pressure will be applied on the inner surface of the piston forcing the piston 1 and the brake pad 9 towards the brake disc 10. This will when the calliper 11 is installed as a hydraulic brake, compress the calliper 11. It is noted that the wording "compress" the calliper 11 also includes situations where the calliper is not shaped as a claw shaped yoke having a counter pressure part on the side opposite to the piston. In addition, the calliper may also be provided with pistons on both sides of the brake disc 10.

The piston 1 is formed at least partly from a polymeric material. This result in that the piston is flexible and deforms at least slightly in response to the pressure of the hydraulic fluid fed into the void of the cylinder bore below the piston head 1b. The deformation of the piston skirt 1b will be towards the wall of the cylinder bore and increases the pressure with which the skirt abuts the cylinder wall. This will produce a sealing between piston skirt 1b and the cylinder wall which in many case will prevent hydraulic fluid to leaks from the cylinder bore along the piston skirt 1b. It is noted that the sealing will be increased with increasing pressure of the hydraulic fluid which is considered to be an advantage.

In addition, the polymeric material allows in many situations the piston to move towards the brake disc although the abutment of the piston skirt 1b at the cylinder wall may increase the friction between the wall and the piston skirt 1b. However, if the friction becomes so large that the piston in no longer able to slide in the cylinder, a braking action will often still be provided as the flexibility of the piston 1 allows the piston head 1 b to deform towards the brake disc 10.

Thus, in many preferred embodiments and as disclosed in FIG. 1, at least a portion of the piston skirt 1a abuts and is biased against the wall of the cylinder bore 3 along a circumference of the cylinder bore 3 so as to provide a hydraulic fluid sealing between the piston 1 and cylinder bore 3. As shown in FIG. 1, the portion abutting is typically the lowest portion of the piston skirt. As will be detailed further below, in connection with tapered pistons, the size of portion of the piston skirt 1b abutting is the wall is often depending on the pressure of the hydraulic fluid.

The biasing of at least a part of the piston skirt 1b against the wall of the cylinder bore 3 is typically applied to obtain a sealing present when the pressure in the void below the piston head 1 is comparable to the pressure of the surroundings. This has inter alia the advantageous effect of limiting the risk of hydraulic fluid leaking out if the pressure during pressure build up (or during standstill with no brake action) should be insufficient to provide a sealing by deformation of the piston skirt 1b. Such biasing against the wall of at least a portion of the piston skirt 1b is typically provided by making the dimension of the portion of the piston skirt 1b designed to abut due to biasing larger than the dimension of the cylinder bore 3 so that this portion of the piston skirt 1b is compressed when the piston 1 is received in the cylinder bore 3.

Figure 5:
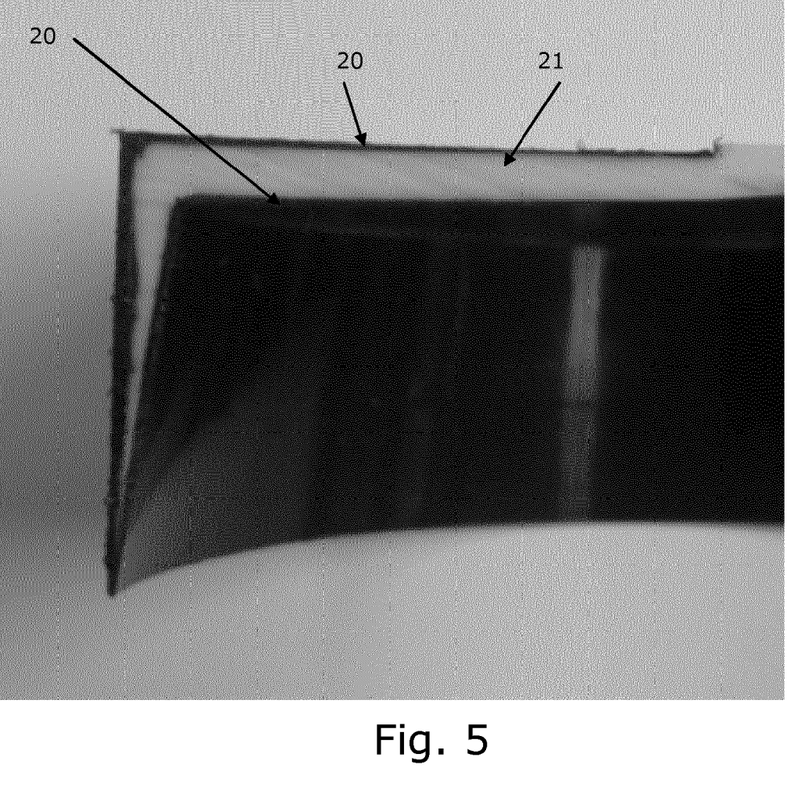
FIG. 5 shows a cross sectional view of a piston; only a quarter of the piston is shown.

The piston 1 is typically a layered construction comprising a core material 21 of polymer and an outer layer 20 of a polyester elastomer (see e.g. FIG. 5). The core material is harder than the outer layer 20 and may be characterised as a hard polymer by which is typically meant a polymeric material having a hardness above 60 on the "Shore D" scale. The polymer is preferably selected from thermoplastic polyester resin (PBT), polyoxymethylene (POM), polysulfone (PSU), poly phenyl sulphide (PPS) or combinations thereof, preferably reinforced by glass fibres, aramid fibres and/or carbon fibres. In embodiments where the core material is metal, the metal is preferably selected from steel or aluminium. The polyester elastomer is preferably selected from thermoplastic polyurethane (TPU), Nitrile rubber, Viton rubber and/or a thermoplastic polyester elastomer (TPE-E).

Such layered constructions have inter alia the advantage that the mechanical strength is provided by the core material and that low friction and desired sealing properties are provided by the outer layer.

Figure 2:
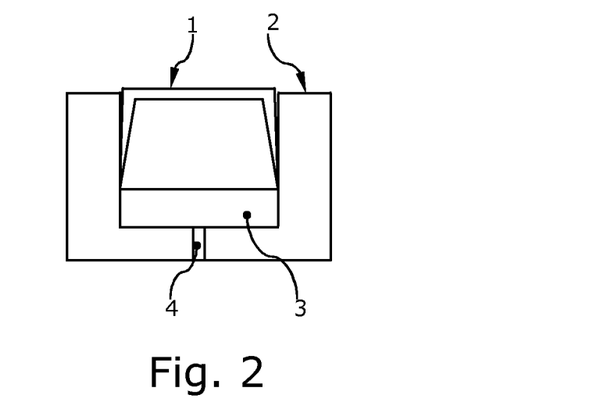
FIG. 2 shows schematically a 2-dimensional cross section view of a brake calliper according to a first embodiment of the present invention (the brake pad as well as the yoke have been left out from the drawing).

As shown more clearly in FIG. 2, the outer surface of the piston skirt 1b is often made frusto-conical shaped with the lowest portion of the piston skirt 1b having the widest dimension, and the portion of the piston skirt abutting and being biased against the wall of the cylinder bore 3 is the lowest portion of the skirt. Such frusto-conical shaped piston skirts 1b are easy to arrange into the cylinder bore 3 and often provides a progressively increasing sealing with increasing pressure due to the deformation of the piston which increases the regions abutting the wall of the cylinder bore 3 and the pressure at which the regions abut the wall of the cylinder bore 3.

As also shown in FIG. 2, the piston 1 is cup shaped (that is the piston comprises a concavity) having its open end facing into the cylinder bore 3 when the piston 1 is received in the cylinder bore 3. This increases the area at which the pressure of the hydraulic fluid may act. The cup-shape it typically provided so that the inner surface of the piston skirt is frusto-conical shaped with the lowest portion of the piston skirt having the widest dimension. As shown in FIG. 2 the frusto-conical outer and inner shapes of the piston skirt 1b differ from each other in the sense that the lower portion of the skirt is the thinnest and the thickness of the skirt 1b gradually increases towards the piston head.

Figure 3:
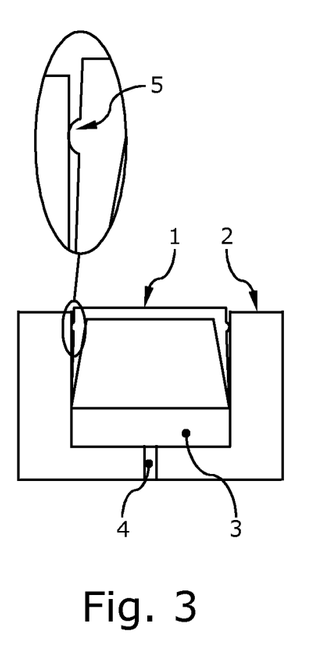
FIG. 3 shows schematically a 2-dimensional cross section view of a brake calliper 10 according to a second embodiment of the present invention (the brake pad as well as the yoke have been left out from the drawing).

With reference to FIG. 3, the piston 1 may comprise a ring shaped bulge 5. The ring shaped bulge 5 is made integral with the piston and is positioned at the piston skirt 1b encircling the piston 1 at a position below piston head 1 a and above the lowest portion of the piston skirt 1b. The ring shaped bulge 5 abuts the cylinder bore and serves as seal preventing hydraulic fluid leaking through the seal provided by the abutment of the lowest portion of the skirt 1b against the wall of the cylinder bore 3.

The ring shaped bulge 5 may also be biased against the wall of the cylinder bore 3. The biasing against the wall of ring shaped bulge 5 is provided by dimensioning the ring shaped bulge 5 so that it is larger than the dimension of the cylinder bore 3, whereby that 5 ring shaped bulge 5 is compressed when the piston 1 is received in the cylinder bore 3.

Although the ring shaped bulge 5 is disclosed as being made integral with the piston 1, the ring shaped bulge 5 may be a separate element arranged in a mating recess provided in the piston 1. Fixation of such a separate ring shaped bulge in the recess is in many cases not needed due to the biasing against the wall of the cylinder bore 3; however, it could be fixed e.g. by gluing.

Figure 4:
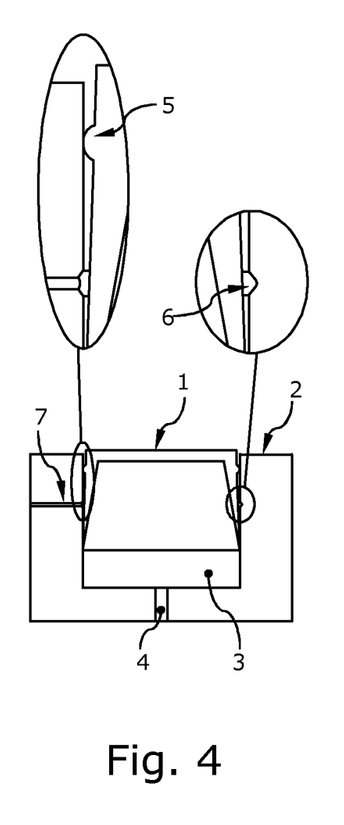
FIG. 4 shows schematically a 2-dimensional cross section view of a brake calliper according to a third embodiment of the present invention (the brake pad as well as the 15 yoke have been left out from the drawing).

With reference to FIG. 4, the calliper 11 may comprise a drainage channel 7 for leak fluid, which is fluid leaking through the seal provided by the abutment of the lowest portion of 15 the skirt 1b against the wall of the cylinder bore 3.

The drainage channel 7 will often, but not necessarily, be in fluid communication with a leak element 6 in the form of a ring shaped element encircling the piston skirt 1b in a position below piston head 1a and above the lower portion of the piston skirt abutting the cylinder bore 3. When a ring shaped bulge 5 is present, the leak element 6 is positioned in between the ring shaped bulge 5 and the lower portion of the piston skirt abutting the cylinder bore 3.

The leak element 6 typically comprises a porous or permeable ring shaped element being in fluid communication with the drainage channel 7 and encircling the piston skirt 1b in a position below the ring shaped bulge 4 and above the lower portion of the piston skirt abutting the cylinder bore 3. The leak element 6 is typically arranged in a recess provided in the wall of the cylinder bore 3 having a portion extending outside the recess as shown in FIG. 4.

Pistons 1 according to the present invention may be produced using conventionally production techniques for layered structures comprising polymeric materials, typically including moulding and finishing. The outer surface of the piston skirt 1b is provided so as to provide sealing effect. Similarly, the calliper is produced by using conventionally production methods and the surface of the cylinder bore 3 is typically honed.

FIG. 5 shows a cut though a piston 1 according to the present invention; only a quarter of a piston 1 is shown. The piston 1 is made from two polymeric materials in a single cast. The thickness of outer layer 20 and the thickness of the core material 21 may vary accordingly at different locations of the piston 1 as shown. In addition, the outer layer 20 may not only be limited to be situated to form the outer surface of the piston but may also form the inner surface of the piston as shown in FIG. 5. However, a typical dimension of the outer layer 20 is around 0.5 mm at the piston head and between 0.5 mm at the lower portion of the piston skirt 1b and 1.6 mm at the upper portion of the piston skirt 1b.

The thickness of the piston head is typically about 4.7 mm and the thickness of the piston skirt 1b is around 4.6 mm at the piston head 1a and runs into a thickness of around 0.5 mm at the end of the piston skirt 1b.

Figure 6:
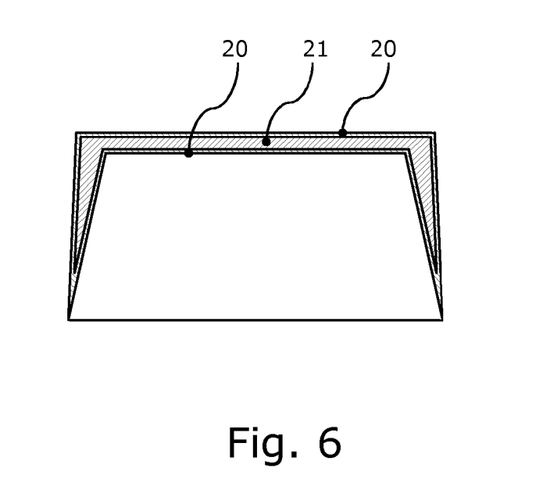
FIG. 6 shows schematically the piston of FIG. 6; a half piston is shown.

A cylinder bore 3 corresponding to the piston of FIG. 5 has a diameter of a 90 mm. A corresponding piston has a diameter of 89 mm measured at the piston head 1a and a diameter around 90.2 to 90.3 mm measured at the end of the piston skirt 1b. It is noted, that the embodiment in FIG. 5 reflects an example and is not to be construed in a limiting way. FIG. 6 shows the piston of FIG. 5 in a schematically view (a half piston is shown).

Brakes according to the invention may preferably form part of a wind turbine brake system. Such systems include controlling devices for controlling the braking action through feeding pressurised hydraulic fluid, such as hydraulic oil, into a calliper 11 as disclosed above. The calliper 11 will in response to receiving pressurised hydraulic oil move the piston 1 toward and force the brake pad to contact a moving part that is to be slowed down or brought to standstill. While the moving part often comprises a conventional brake disc, the invention is not limited to system comprises such conventional brake discs.

In wind turbine applications, callipers and brakes according to the present invention may preferably be arranged as a parking brake to park the rotor of the wind turbine and/or as a yaw brake.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A hydraulic brake calliper for a wind turbine, the brake calliper (11) comprising:
    a cylinder bore (3)
    a piston (1) having a piston head (1b), the piston (1) being received in the cylinder bore (3) in an orientation where the piston head faces towards a brake pad (9) and the piston skirt (1b) extends from the piston head (1a) in a direction away from the brake pad (9); and
    a fluid connection (4) connected to or connectable to a source of hydraulic fluid for leading hydraulic fluid into a void of the cylinder bore (3) below the piston head (1b), so as to move the piston,
    wherein the piston (1) is formed at least partly from a polymeric material or from polymeric materials and at least a portion of the piston skirt (1a) abuts and is biased against a wall of the cylinder bore (3) along a circumference of the cylinder bore (3) so as to provide a hydraulic fluid seal between the piston (1) and cylinder bore (3)
    wherein the piston comprises a ring shaped bulge (5) at the piston skirt (1b) and encircling the piston (1), said ring shaped bulge (5) abutting and biased against the wall of the cylinder bore (3)
    wherein the calliper (11) comprises a drainage channel (7) for leaking fluid and being in fluid communication with a leak element (6) encircling the piston skirt (1b) in a position below the ring shaped bulge (5).

2. A hydraulic brake calliper for a wind turbine according to claim 1, wherein the leak element (6) comprises a porous or permeable ring shaped element being in fluid communication with the drainage channel (7) and encircling the piston skirt (1b) in a position below the ring shaped bulge (5).

3. A hydraulic brake calliper for a wind turbine, comprising:
    a cylinder bore (3)
    a piston (1) having a piston head (1a) and a piston skirt (1b) being received in the cylinder bore (3) in an orientation where the piston head faces towards a brake pad (9) and the piston skirt (1b) extends from the piston head (1a) in a direction away from the brake pad (9); and
    a fluid connection (4) connected to or connectable to a source of hydraulic fluid for leading hydraulic fluid into a void of the cylinder bore (3) below the piston head (1b), so as to move the piston,
    wherein the piston (1) is formed entirely from a polymeric material or from polymeric materials and at least a portion of the piston skirt (1a) abuts and is biased against a wall of cylinder bore (3) along a circumference of the cylinder bore (3) so as to provide a hydraulic fluid seal between the piston (1) and cylinder bore (3).

4. A hydraulic brake calliper for a wind turbine according to claim 3, wherein the piston is a layered construction comprising a core material of a polymer being harder than an outer layer preferably of a polyester elastomer.

5. A hydraulic brake calliper for a wind turbine according to claim 3, wherein the biasing against the wall of at least a portion of the piston skirt (1b) is provided by the dimension of said portion of the piston skirt (1b) being larger than the dimension of the cylinder bore (3) so that said portion of the piston skirt (1b) is compressed when the piston (1) is received in the cylinder bore (3).

6. A hydraulic brake calliper for a wind turbine according to claim 3, wherein the outer surface of the piston skirt (1b) is frusto-conical shaped with the lowest portion of the piston skirt having the widest dimension, and the portion of the piston skirt abutting and being biased against the wall of the cylinder bore (3) is the lowest portion of the skirt.

7. A hydraulic brake calliper for a wind turbine according to claim 3, wherein the piston comprises a ring shaped bulge (5) at the piston skirt (1b) and encircling the piston (1), said ring shaped bulge (5) abutting and biased against the wall of the cylinder bore (3).

8. A hydraulic brake calliper for a wind turbine according to claim 7, wherein the biasing against the wall of the ring shaped bulge (5) is provided by the dimension of the ring shaped bulge (5) being larger than the dimension of the cylinder bore (3) so that the ring shaped bulge (5) is compressed when the piston (1) is received in the cylinder bore (3).

9. A hydraulic brake calliper for a wind turbine according to claim 3, wherein the inner surface of the piston skirt (1b) is frusto-conical shaped with the lowest portion of the piston skirt having the widest dimension.

10. A hydraulic brake calliper for a wind turbine according to claim 3 wherein the calliper (11) comprises a drainage channel (7) for leaking fluid and being in fluid communication with a leak element (6) encircling the piston skirt (1b) in a position below the ring shaped bulge (5).

11. A hydraulic brake calliper for a wind turbine according to claim 10, wherein the leak element (6) comprises a porous or permeable ring shaped element being in fluid communication with the drainage channel (7) and encircling the piston skirt (1b) in a position below the ring shaped bulge (5).

12. A hydraulic brake calliper for a wind turbine according to claim 3 wherein an outer diameter of the piston (1) constantly increases moving from one longitudinal end of the piston (1) to the opposite longitudinal end of the piston (1).

13. A hydraulic brake calliper for a wind turbine according to claim 12 wherein an inner diameter of the piston (1) constantly increases moving from the one longitudinal end of the piston (1) to the opposite longitudinal end of the piston (1).

14. A hydraulic brake calliper for a wind turbine according to claim 13 wherein a thickness of the piston (1) between the inner and outer diameters constantly decreases moving from the one longitudinal end of the piston (1) to the opposite longitudinal end of the piston (1).

15. A hydraulic brake calliper for a wind turbine, comprising:
- a cylinder bore (3)
- a piston (1) having a piston head (1a) and a piston skirt (1b) being received in the cylinder bore (3) in an orientation where the piston head faces towards a brake pad (9) and the piston skirt (1b) extends from the piston head (1a) in a direction away from the brake pad (9); and
- a fluid connection (4) connected to or connectable to a source of hydraulic fluid for leading hydraulic fluid into a void of the cylinder bore (3) below the piston head (1b), so as to move the piston,
- wherein the piston (1) is formed entirely from a polymeric material or from polymeric materials and at least a portion of the piston skirt (1a) abuts and is biased against a wall of cylinder bore (3) along a circumference of the cylinder bore (3) so as to provide a hydraulic fluid seal between the piston (1) and cylinder bore (3)
- wherein an outer diameter of the piston (1) constantly increases moving from one longitudinal end of the piston (1) to the opposite longitudinal end of the piston (1).

16. A hydraulic brake calliper for a wind turbine according to claim 15, wherein the biasing against the wall of at least a portion of the piston skirt (1b) is provided by the dimension of said portion of the piston skirt (1b) being larger than the dimension of the cylinder bore (3) so that said portion of the piston skirt (1b) is compressed when the piston (1) is received in the cylinder bore (3).

17. A hydraulic brake calliper for a wind turbine according to claim 15, wherein the piston is a layered construction comprising a core material of a polymer being harder than an outer layer preferably of a polyester elastomer.

18. A hydraulic brake calliper for a wind turbine according to claim 15, wherein the outer surface of the piston skirt (1b) is frusto-conical shaped with the lowest portion of the piston skirt having the widest dimension, and the portion of the piston skirt abutting and being biased against the wall of the cylinder bore (3) is the lowest portion of the skirt.

19. a hydraulic brake calliper for a wind turbine according to claim 15 wherein an inner diameter of the piston (1) constantly increases moving from the one longitudinal end of the piston (1) to the opposite longitudinal end of the piston (1).

20. A hydraulic brake calliper for a wind turbine according to claim 19 wherein a thickness of the piston (1) between the inner and outer diameters constantly decreases moving from the one longitudinal end of the piston (1) to the opposite longitudinal end of the piston (1).

* * * * *

UNITED STATES PATENT AND TRADEMARK OFFICE
CERTIFICATE OF CORRECTION

PATENT NO.         : 9,273,669 B2
APPLICATION NO.    : 14/366581
DATED              : March 1, 2016
INVENTOR(S)        : Poul Sejer Nielsen and Peter Hornskov It is certified that error appears in the above-identified patent and that said Letters Patent is hereby corrected as shown below:

In the Claims

In column 9, line 38 (claim 1), "a piston (1) having a piston head (1b)," should read "a piston (1) having a piston head (1a) and a piston skirt (1b),".

In column 10, lines 2-3 (claim 3), "piston skirt (1b) being received" should read "piston skirt (1b), the piston (1) being received".

In column 11, lines 9-10 (claim 15), "piston skirt (1b) being received" should read "piston skirt (1b), the piston (1) being received".

In column 11, line 19 (claim 15), "wherein the piston (1) is formed entirely from a polymeric" should read "wherein the piston (1) is formed at least partly from a polymeric".

Signed and Sealed this
Thirty-first Day of May, 2016

Michelle K. Lee
*Director of the United States Patent and Trademark Office*